US008648693B2

(12) United States Patent
Tsuruta

(10) Patent No.: US 8,648,693 B2
(45) Date of Patent: Feb. 11, 2014

(54) KEY SLOT DEVICE FOR IN-VEHICLE AUXILIARY KEY

(75) Inventor: Hiroshi Tsuruta, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 647 days.

(21) Appl. No.: 12/564,775

(22) Filed: Sep. 22, 2009

(65) Prior Publication Data

US 2010/0071427 A1    Mar. 25, 2010

(30) Foreign Application Priority Data

Sep. 24, 2008   (JP) ................................. 2008-244631

(51) Int. Cl.
  *B60R 25/00*   (2013.01)
(52) U.S. Cl.
  USPC ............. 340/5.1; 340/5.2; 340/5.3; 340/5.31; 340/5.72; 340/5.73; 340/572.1; 70/336; 70/337; 206/37.1; 206/37.3; 206/37.4

(58) Field of Classification Search
  None
  See application file for complete search history.

(56) References Cited

U.S. PATENT DOCUMENTS

| 3,851,505 | A | * | 12/1974 | Wilkinson | 70/255 |
| 4,641,509 | A | * | 2/1987 | Batchelor et al. | 70/388 |
| 4,898,010 | A | * | 2/1990 | Futami et al. | 70/278.1 |
| 5,422,632 | A | * | 6/1995 | Bucholtz et al. | 340/5.24 |
| 5,959,540 | A | * | 9/1999 | Walter | 340/5.64 |
| 6,827,256 | B2 | * | 12/2004 | Stobbe | 235/375 |
| 7,336,174 | B1 | * | 2/2008 | Maloney | 340/572.1 |
| 7,392,675 | B2 | * | 7/2008 | Kito | 70/252 |
| 7,930,915 | B2 | * | 4/2011 | Katagiri | 70/252 |
| 8,011,214 | B2 | * | 9/2011 | Katagiri et al. | 70/252 |
| 8,089,339 | B2 | * | 1/2012 | Mikan et al. | 340/5.2 |
| 8,138,887 | B2 | * | 3/2012 | Hirano | 340/5.73 |
| 8,487,740 | B2 | * | 7/2013 | Tsuruta et al. | 340/5.22 |
| 2001/0033221 | A1 | * | 10/2001 | Thomas et al. | 340/5.61 |
| 2003/0213845 | A1 | * | 11/2003 | Hermann et al. | 235/385 |
| 2004/0075530 | A1 | * | 4/2004 | Ghabra et al. | 340/5.6 |
| 2005/0159856 | A1 | * | 7/2005 | Daghan et al. | 701/1 |
| 2007/0090921 | A1 | * | 4/2007 | Fisher | 340/5.73 |
| 2008/0100418 | A1 | * | 5/2008 | Stobbe et al. | 340/5.73 |
| 2008/0150683 | A1 | * | 6/2008 | Mikan et al. | 340/5.31 |
| 2009/0064740 | A1 | * | 3/2009 | Katagiri et al. | 70/237 |
| 2009/0064741 | A1 | * | 3/2009 | Katagiri | 70/237 |
| 2009/0091421 | A1 | * | 4/2009 | Hirano | 340/5.7 |

FOREIGN PATENT DOCUMENTS

| JP | 2001279964 A | 10/2001 |
| JP | 2002180711 A | 6/2002 |
| JP | 2004025936 | 1/2004 |
| JP | 2004190381 A | 7/2004 |

* cited by examiner

*Primary Examiner* — Benjamin C Lee
*Assistant Examiner* — Rajsheed Black-Childress
(74) *Attorney, Agent, or Firm* — Duane Morris LLP; J. Rodman Steele, Jr.; Gregory M. Lefkowitz

(57) ABSTRACT

A key slot capable of accommodating an auxiliary key, which is a vehicle key other than a master key. A key lock mechanism locks or unlocks movement of the auxiliary key in the key slot, thereby allowing the auxiliary key to be taken out of the key slot in accordance with a lending condition of the auxiliary key. An invalid key return prevention unit permits the auxiliary key to be returned to the key slot in accordance with a return condition of the auxiliary key. If the return condition is met, the invalid key return prevention unit causes the key lock mechanism to lock the auxiliary key in the key slot. If the return condition is not met, the invalid key return prevention unit does not allow the auxiliary key to be returned to the key slot.

10 Claims, 11 Drawing Sheets

Fig.11

List of Restriction of Functions for Each Level of Assist Key System

| Item of Restriction | | Level | | | |
|---|---|---|---|---|---|
| | | Lv.1 | Lv.2 | Lv.3 | Lv.4 |
| | Manipulation of Glove Compartment Switch (Steering Wheel) | × | × | × | × |
| ① | Travel Distance | | | | × |
| ② | Traveling Speed | | | | × |
| ③ | Manipulation of Car Navigation System | | | × | × |
| ④ | Manipulation of Trunk Switch | | | × | × |
| ⑤ | Manipulation of Fill Opening Switch | | | × | × |
| ⑥ | Manipulation of Console Box Switch | | | | × |
| ⑦ | Manipulation of Seat Memory | | × | × | × |
| ⑧ | Manipulation of Rear-side Air Conditioner Switch | | | × | × |
| ⑨ | Manipulation of Car Phone | | | × | × |
| ⑩ | Manipulation of ETC | | | × | × |
| ⑪ | Manipulation of G-BOOK | | | × | × |

Fig.12

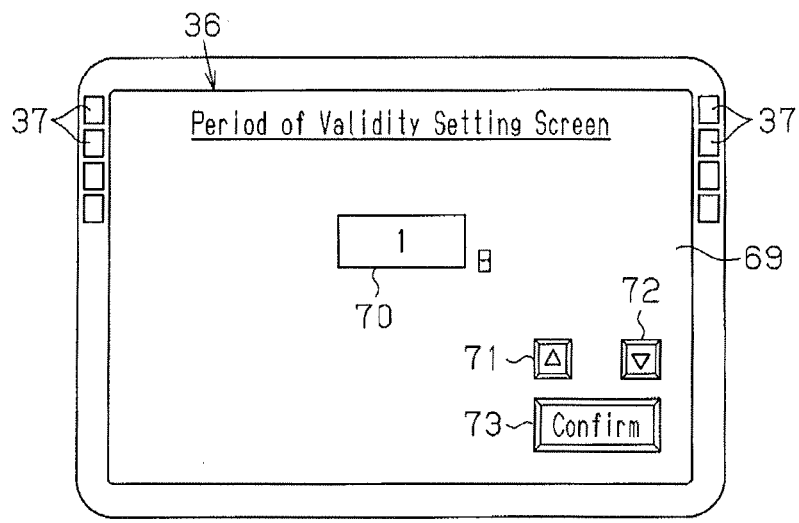

Key (Foreign Object) Inserted Halfway

Key Equivalent Inserted with Key Insertion Detection Switch Turned OFF
(Tampering Insertion of Finger or Foreign Object)

KEY SLOT DEVICE FOR IN-VEHICLE AUXILIARY KEY

CROSS-REFERENCE TO RELATED APPLICATIONS

This application is based upon and claims the benefit of priority from prior Japanese Patent Application No. 2008-244631, filed on Sep. 24, 2008, the entire contents of which are incorporated herein by reference.

BACKGROUND OF THE INVENTION

The present invention relates to a key slot device of an in-vehicle auxiliary key, into which is inserted an auxiliary key that is kept in a vehicle as a vehicle key (in which the key is set), and more particularly, to a key slot device of an in-vehicle auxiliary key that retains an auxiliary key locked therein until the auxiliary key is permitted to be lent.

Various types of vehicle lending systems have been conventionally invented that allow a vehicle to be lent under a restricted use condition to a third person. This is because if a vehicle is lent to a third person in a state where the vehicle can be used without restriction, the borrower may use the vehicle at his/her discretion. Japanese Laid-Open Patent Publication No. 2004-25936 discloses one example of such a vehicle lending system employing restricted use conditions. In the publication, no restriction is placed on the vehicle when the vehicle is operated using a master key, and a restricted use condition is employed when the vehicle is operated using a sub-key. When lending the vehicle, the sub-key is handed to a borrower, so that the borrower can use the vehicle under a restricted use condition.

The vehicle lending system of the above publication requires the user to carry a master key and a sub-key. This increases the number of articles a user needs to carry, making it inconvenient for the user. Also, if the user needs to lend the vehicle to a third person when not carrying the sub-key, he/she must go get the sub-key from the place where it is kept. This also makes it inconvenient for the user.

Other types of restricted condition vehicle lending systems include, for example, an assist key system. The assist key system includes a vehicle key (hereinafter, referred to as an assist key), which is used only when the use of the vehicle is restricted, and is installed in the vehicle in advance. When lending the vehicle to a third person, the user lends the assist key so that the vehicle can be used only under restriction. The assist key functions as a type of sub-key as described above, and has a key code for restricting the use of the vehicle. This eliminates the necessity for carrying two types of vehicle keys, and thus increases convenience.

The assist key of the assist key system is placed, for example, in the glove compartment of the vehicle. For example, a key slot is installed in the glove compartment and the assist key is inserted into the key slot and kept therein. If the assist key inserted in the key slot can be freely removed therefrom, anybody can freely take the assist key and use the vehicle. This lowers the security level against key theft. Therefore, the assist key system preferably includes in the key slot a key retaining device (key lock device) that is capable of locking the inserted assist key into the key slot. In this case, when the assist key is permitted to be lent, the key retaining device is unlocked, which allows the assist key to be removed.

In some cases, instead of properly returning assist key to the key slot, some people tamper with the key slot by putting a foreign object or a finger into the key slot. If the key lock device is locked with a foreign object inserted, the foreign object gets caught in the device and may cause a breakdown of the device. There has therefore been a demand for a technology that does not activate the key lock device in such cases.

SUMMARY OF THE INVENTION

The present invention provides a key slot device for an in-vehicle auxiliary key that prevents a key slot awaiting the insertion of an auxiliary key from receiving an invalid key.

To achieve the foregoing objective and in accordance with one aspect of the present invention, a key slot device for an in-vehicle auxiliary key is provided. The key slot device includes a key slot, a key lock mechanism, and an invalid key return prevention unit. The key slot is capable of accommodating the auxiliary key, which is a vehicle key other than a master key. The key lock mechanism locks or unlocks movement of the auxiliary key in the key slot, thereby allowing the auxiliary key to be removed from the key slot in accordance with a lending condition of the auxiliary key. The invalid key return prevention unit permits the auxiliary key to be returned to the key slot in accordance with a return condition of the auxiliary key. If the return condition is met, the invalid key return prevention unit causes the key lock mechanism to lock the auxiliary key in the key slot, and if the return condition is not met, the invalid key return prevention unit does not allow the auxiliary key to be returned to the key slot.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 11 is a table showing a list of restriction of functions for each level of the assist key system;

FIG. 12 is a diagram showing a screen for setting a period of validity;

DETAILED DESCRIPTION OF THE PREFERRED EMBODIMENTS

Figure 1:
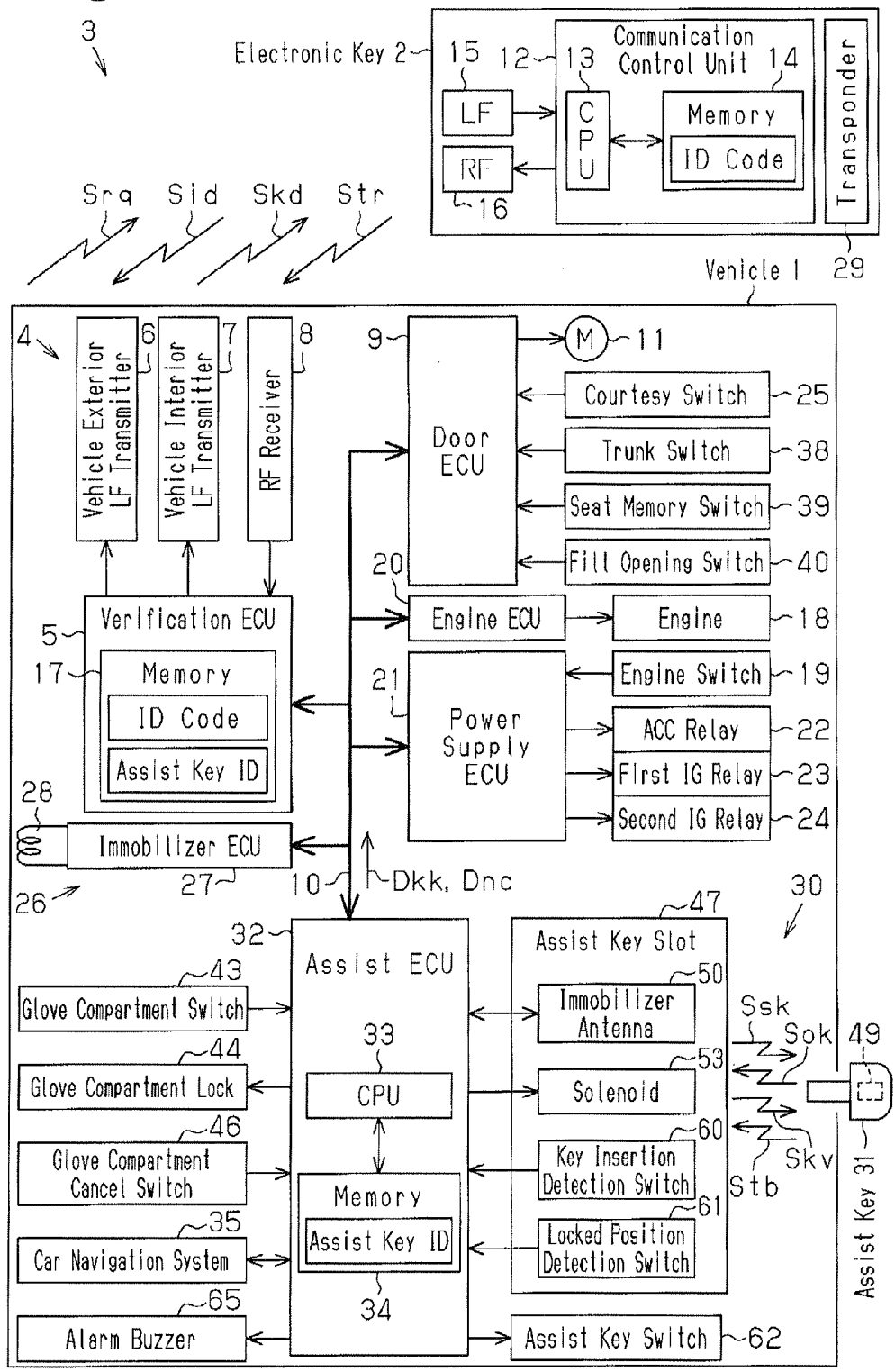
FIG. 1 is a block diagram schematically showing the configuration of an assist key system according to one embodiment.

In the drawings, like numerals are used for like elements throughout.

A key slot device of an in-vehicle auxiliary key according to one embodiment of the present invention will now be described with reference to FIGS. 1 to 19.

As shown in FIG. 1, a vehicle 1 has an electronic key system 3 that performs key verification using an electronic key 2 serving as a vehicle key. When the verification is established, the electronic key system 3 locks or unlocks the doors, or starts the engine or allows the engine to be started. One type of the electronic key system 3 is a key operation-free system 4, which allows the electronic key 2 to transmit an ID code without manipulation of keys. The electronic key 2 is capable of performing short-range wireless communications with the vehicle 1. The electronic key 2 wirelessly transmits its unique key code to the vehicle 1, which in turn performs key verification. The electronic key 2 corresponds to a master key.

The key operation-free system 4 includes a smart entry system that locks and unlocks the doors without any manipulation of keys. The vehicle 1 equipped with the smart entry system includes a verification ECU (Electronic Control Unit) 5 for performing key verification (ID verification) with the electronic key 2. The verification ECU 5 is connected to a vehicle exterior LF transmitter 6 that transmits signals of in a low frequency (LF) band (approximately 130 KHz) to the outside, a vehicle interior LF transmitter 7 that transmits signals in the same LF band to the vehicle interior, and an RF receiver 8 that receives signals of the RF band (approximately 312 MHz). The verification ECU 5 is connected to a door ECU 9, which controls the locking and unlocking of the door though an in-vehicle Local Area Network (LAN) 10. The door ECU 9 is connected to a door lock motor 11, which serves as a drive source for locking and unlocking the door. The key operation-free system 4 corresponds to a master key verification unit.

The electronic key 2 is provided with a communication control unit 12 for controlling operations of the electronic key 2 in an integrated manner. The communication control unit 12 includes various devices such as a CPU 13 and a memory 14. The memory 14 stores an ID code, which is a unique key code of the electronic key 2. The communication control unit 12 is connected to an LF receiver 15 that receives wireless signals of the LF band and a RF transmitter 16 that transmits wireless signals of a low RF band (approximately 312 MHz). The communication control unit 12 constantly monitors what kind of wireless signals are received by the LF receiver 15, and controls the signal transmission operation of the RF transmitter 16.

When the vehicle 1 is in a parked state, the verification ECU 5 causes the vehicle exterior LF transmitter 6 to intermittently transmit a request signal Srq in the LF band, thereby forming a vehicle exterior communication area of the request signal Srq around the vehicle 1 (approximately, a few meters wide). In this way, the verification ECU 5 attempts to establish a short-range wireless communication (hereinafter, referred to as smart communication). When entering the vehicle exterior communication area and receiving the request signal Srq, the electronic key 2, in response to the request signal Srq, transmits an ID signal Sid including the ID code stored in its memory 14 through signals in the low RF band. The verification ECU 5 performs the smart communication by causing the RF receiver 8 to receive the ID signal Sid. The verification ECU 5 then checks the ID code registered in its memory 17 against the ID code of the electronic key 2 to perform ID verification, or the "smart verification" (vehicle exterior verification). After determining that the vehicle exterior verification is established, the verification ECU 5 allows or executes locking or unlocking of the doors through the door ECU 9.

Figure 2:
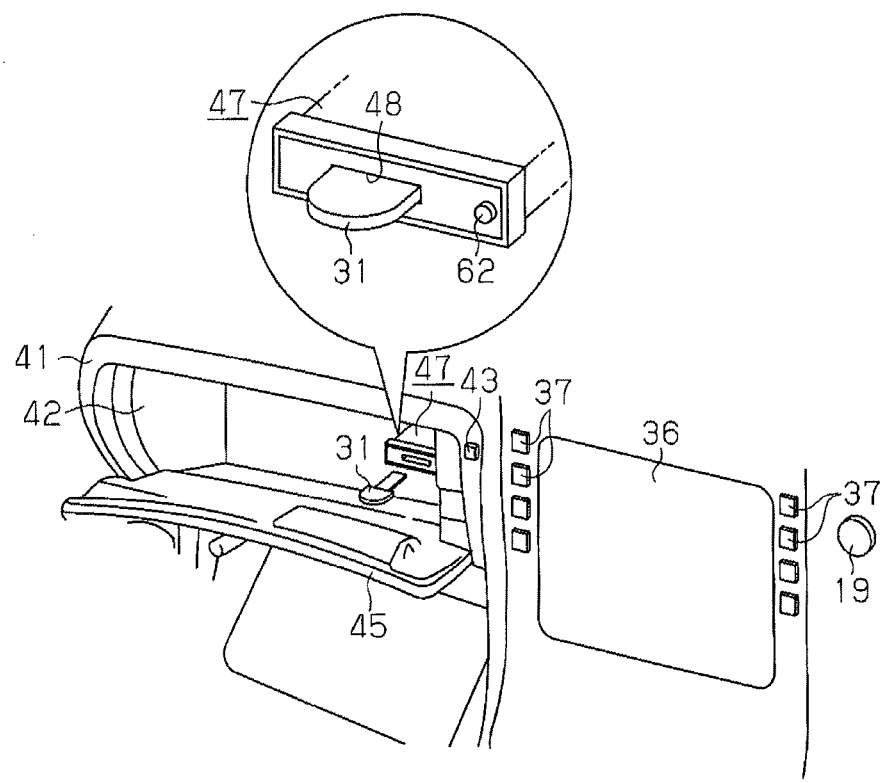
FIG. 2 is a perspective view showing the interior of a glove compartment and its surroundings.

The key operation-free system 4 includes a one-push engine start system enabling the starting and stopping of the engine 18 by just manipulating a switch. Physical operation of the vehicle key is not necessary. The one-push engine start system includes an engine switch 19, which serves as an operating system, located in the vehicle as shown in FIG. 2. The engine switch 19 is, for example, a momentary push type and has a power supply transition operation function, which switches the power supply state of the vehicle 1 from the current state to the next state each time it is operated.

The vehicle 1 is also connected to an engine ECU 20 that controls the engine 18 in an integrated manner and a power supply ECU 21 that controls in-vehicle electrical components. The ECUs 20, 21 are connected to the other ECUs such as the verification ECU 5 through the in-vehicle LAN 10. The power supply ECU 21 is connected to an ACC (Accessory) relay 22, which is connected to various in-vehicle accessories, a first IG (Ignition) relay 23, which is connected to electrical components of the drive system, and a second IG relay 24, which is connected to the engine ECU 20 and a starter relay.

When recognizing via a courtesy switch 25 that the driver has entered the vehicle, the verification ECU 5 causes the vehicle interior LF transmitter 7, instead of the vehicle exterior LF transmitter 6, to transmit the request signal Srq thereby forming a vehicle interior communication area in the entire vehicle interior. When receiving the ID signal Sid in response from the electronic key 2, which is located in the vehicle interior communication area, with the RF receiver 8, the verification ECU 5 verifies the ID code of the electronic key 2 with the ID code registered in the verification ECU 5. That is, the verification ECU 5 performs the ID verification, or the "smart verification" (vehicle interior verification). After determining that the vehicle interior verification is established, the verification ECU 5 allows the starting of the engine and the power supply transition operation to be performed through the engine switch 19.

The vehicle 1 is equipped with an immobilizer system 26 serving as a type of the electronic key system 3. The immobilizer system 26 performs key verification with the electronic key 2 through a communications network independent from that of the smart communication. The immobilizer system 26 utilizes the near field communication (hereinafter, referred to as immobilizer communication), which is, for example the REID (Radio Frequency Identification) in the present embodiment. The immobilizer system 26 includes an immobilizer ECU 27, which is mounted in the vehicle 1 and controls the immobilizer system 26 in an integrated manner. The immobilizer ECU 27 is connected to the verification ECU 5 via the in-vehicle LAN 10. The immobilizer ECU 27 is also connected to a coil type immobilizer antenna 28, which serves as the vehicle-side antenna of the immobilizer system 26. The immobilizer antenna 28 is installed, for example, by being wound about the engine switch 19. In the present embodiment, the immobilizer antenna 28 is capable of transmitting and receiving signals in the LF band.

The electronic key 2 incorporates a transponder 29, in which an ID of the electronic key 2 in the immobilizer system 26 is registered. The transponder 29 is activated when receiving drive radio waves Skd transmitted by the immobilizer antenna 28, and transmits to the vehicle 1 an immobilizer signal Str including a transponder code (key code), which is the unique code. When receiving the immobilizer signal Str through the immobilizer antenna 28, the immobilizer ECU 27 performs immobilizer verification based on the immobilizer signal Str, and allows the engine to be started if the verification is established. The near field communication refers to wireless communication having a smaller communication area than the smart communication. In reality, the near field communication requires the transponder 29 to be held over the immobilizer antenna 28.

When the driver pushes the engine switch 19 to execute the starting of the engine 18, the engine ECU 20 starts the engine 18 on the condition that at least one of the vehicle interior verification and the immobilizer verification is established. Being powered by an incorporated battery, the electronic key 2 can no longer perform the smart communication if the battery runs out. However, even if the battery of the electronic key 2 runs out, the engine 18 can be started if the ID verification is established through the immobilizer communication.

The vehicle 1 is equipped with an assist key system 30. When the vehicle 1 is to be lent to a borrower, a vehicle key other than the electronic key 2 is handed to the borrower. At this time, the security level of the vehicle 1 is determined using the assist key system 30, so that the use conditions of the vehicle 1 are restricted. The assist key system 30 of the present embodiment uses a vehicle key, which is referred to as an assist key 31. The assist key 31 serves as an auxiliary key. When lending the vehicle 1 to a borrower, the user hands the assist key 31 mounted in the vehicle 1 to the borrower. Each time the user hands the assist key 31 to a borrower, the assist key system 30 sets the security level of the vehicle 1, that is, the security level of the assist key 31 (hereinafter, referred to as assist key level), thereby restricting the use conditions of the vehicle 1. The assist key 31 corresponds to an auxiliary key.

The assist key system 30 will now be described. The vehicle 1 includes an assist ECU 32, which is a control unit of the assist key system 30. The assist ECU 32 includes various types of device elements such as a CPU 33 and a memory (ROM, RAM) 34, and is connected to other in-vehicle ECUs such as the verification ECU 5 via the in-vehicle LAN 10. The assist ECU 32 is formed by a dedicated PC board (substrate), on which various device elements such as the CPU 33 and the memory 34 are mounted. The assist ECU 32 functions as an auxiliary key verification unit, a restriction setting unit, and an auxiliary key lending permitting unit.

The assist ECU 32 is connected to a car navigation system 35, which is mounted in the vehicle 1. The car navigation system 35 functions as an electronic device that shows the current position during driving and guides the driver along a path to the destination. The car navigation system 35 includes a touch panel display 36 (see FIG. 2) and a group of various types of input switches 37 (see FIG. 2) serving as an input system other than the touch panel type. The car navigation system 35 determines the current position using the GPS (Global Positioning System) and shows on a display 36 the current position and a route to the destination. The display 36 and the input switches 37 of the car navigation system 35 are also used as the input system and the display system of the assist key system 30. The restriction setting unit may include the display 36.

As shown in FIG. 1, the vehicle 1 includes a trunk switch 38, a seat memory switch 39, and a fill opening switch 40. The trunk switch 38 is operated when opening the trunk from the closed state. The seat memory switch 39 is operated when registering the fore-aft position of the driver's seat. The fill opening switch 40 is operated when opening the fill opening from the closed state. These switches 38 to 40 are connected to the door ECU 9 via electrical wiring, and the operational states of the switches 38 to 40 are monitored by the door ECU 9. The door ECU 9 follows notification commands from the assist ECU 32, and determines whether each of the operations of the switches 38 to 40 is valid or invalid in accordance with the restriction state of the vehicle 1 at the time.

As shown in FIG. 2, a glove compartment 42 serving as an accommodation chamber is provide in a dashboard 41 at the front passenger seat of the vehicle 1. The glove compartment 42 is embedded in the dashboard 41. Referring to FIGS. 1 and 2, the glove compartment 42 has a glove compartment switch 43, which is operated when the glove compartment 42 is opened from the closed state. The glove compartment switch 43 is formed by a momentary switch of a push type, and is electrically connected to the assist ECU 32. The glove compartment 42 also has a glove compartment lock 44 (see FIG. 1), which locks the glove compartment in the closed state. The glove compartment lock 44 is, for example, a mechanical interlocking type including a latch and a striker. In the mechanical interlocking type, when a lid 45 of the glove compartment 42 is closed, the latch is pushed and moved by the striker against the urging force of an urging member such as coil springs (not shown). When the lid 45 is maximally closed, the latch moves in a direction opposite from the direction in which the lid 45 has been moved, and is engaged with the striker. When detecting that the glove compartment switch 43 is pressed while the glove compartment 42 is in the closed state, the assist ECU 32 unlocks the glove compartment lock 44, thereby causing the lid 45 of the glove compartment 42 to pivot to open by an urging member (not shown), which is, for example, a torsion spring, so that the glove compartment 42 is in the open state.

As shown in FIG. 1, the vehicle 1 includes a glove compartment cancel switch 46, which is operated when prohibiting the opening of the glove compartment 42. The glove compartment cancel switch 46 is formed, for example, by a push type alternate switch provided close the driver's seat, and is electrically connected to the assist ECU 32. When the glove compartment cancel switch 46 is ON, the assist ECU 32 prohibits the opening of the glove compartment 42. That is, in the prohibition state, even if the glove compartment switch 43 is pressed, the assist ECU 32 ignores the pressing and maintains the closed state of the glove compartment 42.

A key slot (assist key slot) 47 is provided in the glove compartment 42 (see FIG. 2). The key slot 47 serves as a place where the assist key 31 is kept in the vehicle (key insertion portion). As shown in FIG. 2, a key insertion hole 48 serving as an insertion port for the assist key 31 is formed in the front face of the key slot 47. The assist key 31 is insertable through the insertion port 48 with part thereof exposed from the slot 47. The assist key 31 is inserted in the key slot 47 when the authorized user uses the vehicle 1 under the non-restricted condition. When lending the vehicle 1 to a third person, the assist key 31 is removed from the key slot 47 and handed to the borrower as the vehicle key.

Figure 3:
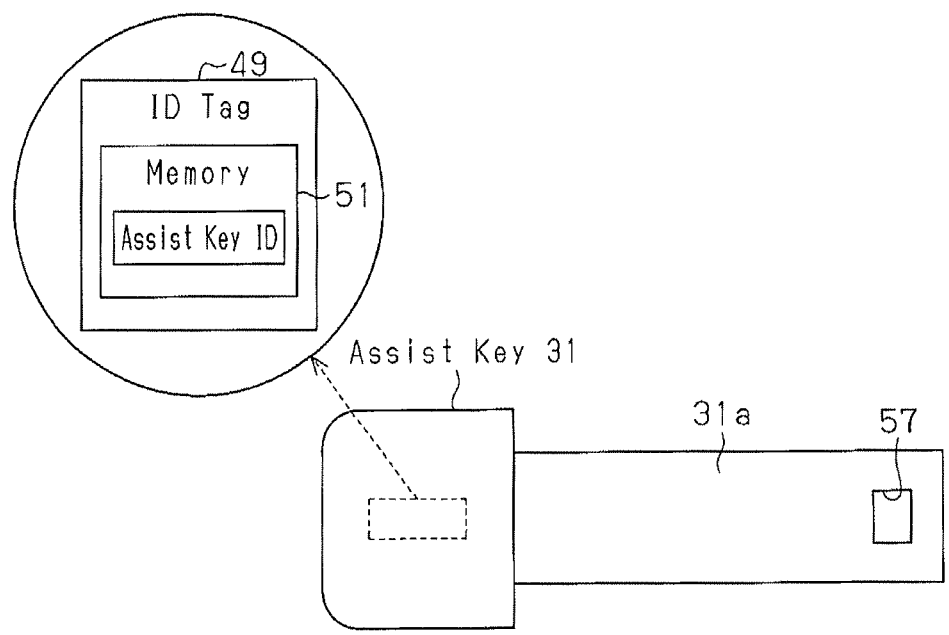
FIG. 3 is a conceptual diagram schematically showing an assist key.

Like the electronic key 2, the assist key 31 is formed by incorporating an electronic key feature in a mechanical key as illustrated in FIGS. 1 to 3. As shown in FIG. 3, an ID tag 49 similar to the transponder 29 used in the immobilizer system 26 is incorporated in the assist key 31. The ID tag 49 is capable of performing wireless communications with the vehicle 1 (the key slot 47) according to the RFID. An assist key ID, which is a unique key code of the assist key 31, is registered in the ID tag 49. The assist key ID contains a code string. When the ID verification is established between the assist key 31 and the vehicle 1 with the assist key ID, the vehicle 1 can be used only under a restricted condition.

Also, as shown in FIG. 1, the key slot 47 incorporates an immobilizer antenna 50, which serves as a vehicle side antenna of the assist key system 30. The immobilizer antenna 50 is formed by winding an antenna wire several turns about the key insertion hole 48, and is electrically connected to the assist ECU 32. The ID tag 49 is capable of performing two-way wireless communications with the immobilizer antenna 50 according to the RFID communication. The immobilizer antenna 50 transmits an ID registration signal Ssk including the assist key ID. When receiving the ID registration signal Ssk, the ID tag 49 registers in a memory 51 thereof (see FIG. 3) the assist key ID included in the ID registration signal Ssk, and allows the assist key 31 to serve as a vehicle key. The ID registration signal Ssk includes the assist key ID discussed above and drive radio waves for activating the tag 49 from the stopped state. After normally completing the registration of the assist key ID in the memory 51, the ID tag 49 transmits a registration completion notification Sok for notifying of the normal completion through signals in the LF band, thereby notifying the vehicle 1 of the completion of the ID registration. The auxiliary key verification unit may include the ID tag 49 and the immobilizer antenna 50.

As illustrated in FIGS. 4 to 7, the assist key slot 47 includes an assist key lock 52, which prevents the assist key 31 from being removed without permission when the assist key 31 is inserted in the slot 47 (completely inserted state). The assist key lock 52 includes a solenoid 53, which serves as a drive source of the assist key lock 52, in the key slot 47. The solenoid 53 is connected to the assist ECU 32 via electrical wiring. The operation of the solenoid 53 is controlled by the assist ECU 32. The solenoid 53 of the present embodiment is, for example, a pull solenoid. In a deactivated state where no electricity is supplied to the solenoid 53, the urging force of an urging member 54 (see FIG. 4) in the solenoid 53 allows a movable lever 55 to move (reciprocate) along the axis of the movable lever 55. In this state, the movable lever 55 partly projects to the outside by a predetermined amount (the state shown in FIG. 4). In an activated state where electricity is supplied to the solenoid 53, the movable lever 55 is in a retracted state (the state shown in FIG. 5), and is maintained in this state as long as the supply of electricity continues. The assist key lock 52 corresponds to a key lock mechanism.

Figure 7:
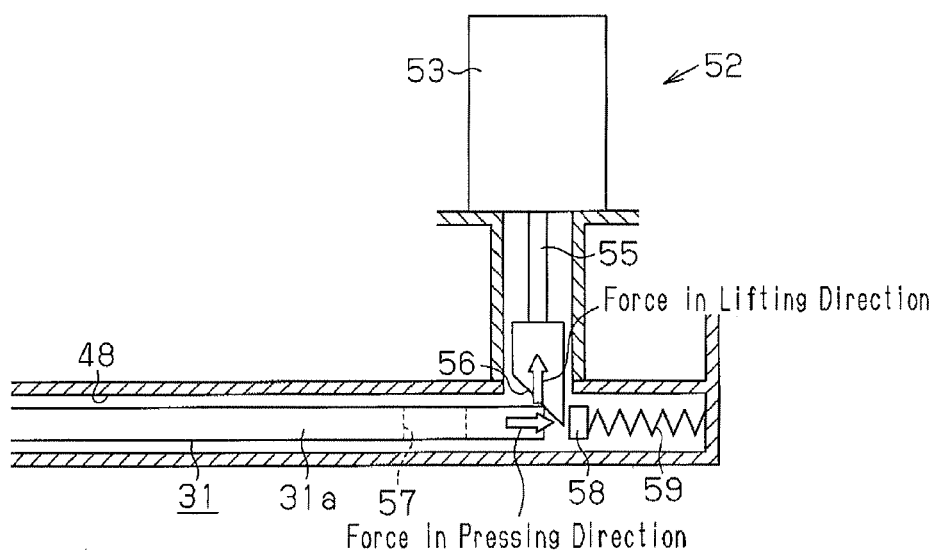
FIG. 7 is a vertical cross-sectional view illustrating the assist key lock when receiving the assist key.

The distal end of the movable lever 55 has an inclined surface portion 56, which is a tapered shape formed on a side facing the key insertion hole 48 of the key slot 47. When the assist key 31 inserted in the key slot 47 contacts the movable lever 55 as shown in FIG. 7, the inclined surface portion 56 converts the force in the insertion direction applied to the movable lever 55 by the assist key 31 into a force that lifts the movable lever 55, thereby allowing the assist key 31 to escape rearward. Thus, the assist key 31 can be pressed further inward than the movable lever 55.

On the other hand, an engagement hole 57 is formed in the distal end of a key plate 31a of the assist key 31. The engagement hole 57 receives the movable lever 55. The engagement hole 57 is located at a position to face the movable lever 55 when the assist key 31 is completely inserted in the key slot 47. The assist key 31 inserted in the key slot 47 is pushed to the complete insertion position, the movable lever 55 is hooked to the engagement hole 57. Then, the assist key lock 52 is switched from an unlocked state (the state shown in FIG. 5) to a locked state (the state shown in FIG. 4). This causes the assist key 31 to be held by the key slot 47, prohibiting removable of the assist key 31.

A push piece 58 is attached to the bottom of the key insertion hole 48 of the key slot 47. When the assist key lock 52 is switched from the locked state to the unlocked state, the push piece 58 causes the assist key 31, which is completely inserted in the key slot 47, to project to the outside by a predetermined amount. This facilitates the removable of the assist key 31 from the key slot 47. The push piece 58 is attached with an urging member 59 so as to be movable in the longitudinal direction of the key insertion hole 48. The urging member 59 urges the push piece 58 toward the opening of the key insertion hole 48. The urging member 59 is, for example, a coil spring.

A key insertion detection switch 60 (see FIG. 1) is provided in the vicinity of the inlet of the key insertion hole 48 of the key slot 47. The key insertion detection switch 60 detects whether the assist key 31 is inserted. The key insertion detection switch 60 is connected to the assist ECU 32 via electric wiring and is formed, for example, by a microswitch. When detecting insertion motion into the key slot 47, the key insertion detection switch 60 sends a detection signal (for example, an ON signal) to the assist ECU 32. Based on the detection signal sent from the key insertion detection switch 60, the assist ECU 32 can check whether there is a key in the vicinity of the inlet of the key insertion hole 48. For example, the assist ECU 32 can detect a halfway insertion of the assist key 31. An auxiliary key detection unit may include the key insertion detection switch 60 (an inlet key detection unit).

Further, a locked position detection switch 61 (see FIG. 1) is located at the bottom of the key insertion hole 48 of the key slot 47. The locked position detection switch 61 detects that the assist key 31 is completely inserted in the key slot 47, or that the assist key 31 has reached the locked position. The locked position detection switch 61 is connected to the assist ECU 32 via electric wiring and is formed, for example, by a microswitch. When detecting that the assist key 31 has reached the locked position in the key slot 47, the locked position detection switch 61 sends a detection signal (for example, an ON signal) to the assist ECU 32. Based on the detection signal sent from the locked position detection switch 61, the assist ECU 32 checks whether the assist key 31 has been inserted into the key slot 47 until it reaches the locked position. The auxiliary key detection unit may include the locked position detection switch 61 (an inward key detection unit).

The assist key slot 47 has an assist key switch 62, which is manipulated when taking out the assist key 31 inserted in the slot 47. The assist key switch 62 is formed by a momentary switch of a push type, and is electrically connected to the assist ECU 32. When the assist key switch 62 is pressed, the assist ECU 32 launches a screen 63 for setting the assist key level (see FIG. 9) on the display 36 of the car navigation system 35. When the assist key level is set, the assist ECU 32 registers in the assist key 31 an assist key ID that corresponds to the assist key level. After the ID registration, the assist ECU 32 unlocks the assist key lock 52, thereby allowing the assist key 31 to be taken out from the key slot 47.

Figure 4:
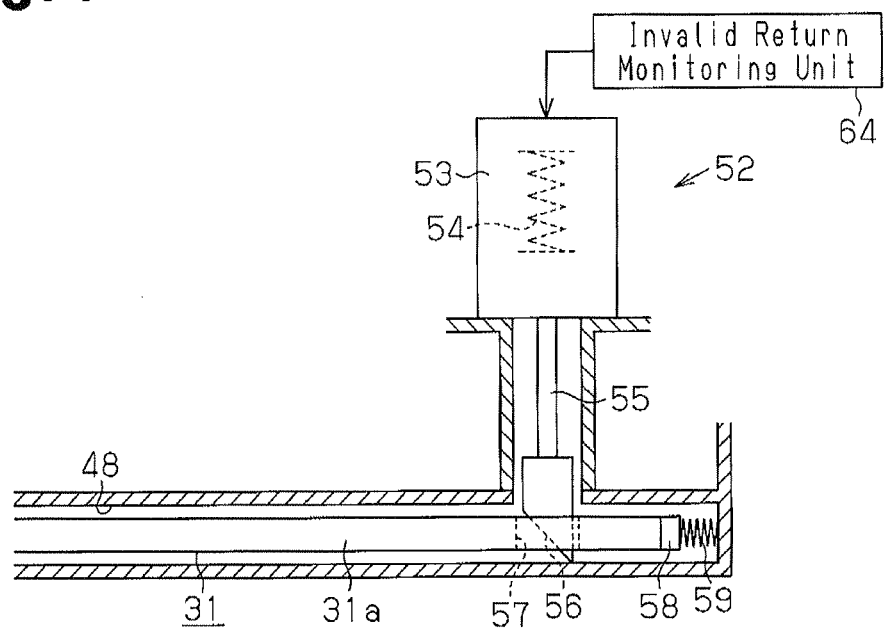
FIG. 4 is a vertical cross-sectional view illustrating an assist key lock in a locked state.
Figure 5:
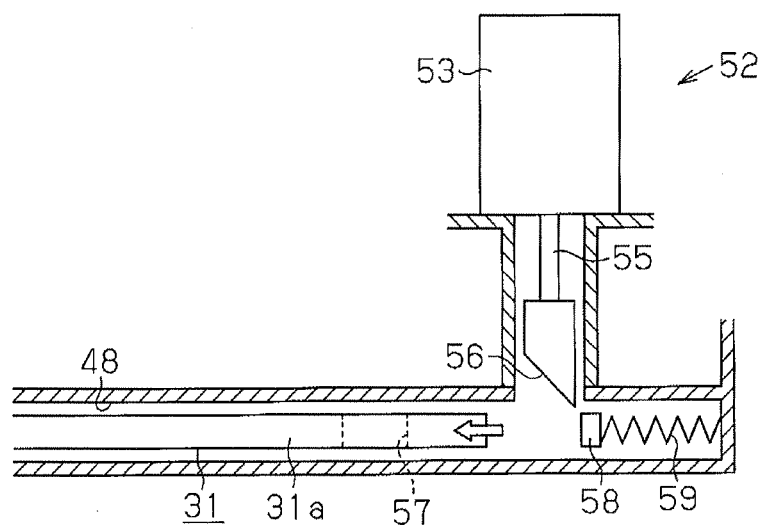
FIG. 5 is a vertical cross-sectional view illustrating the assist key lock in an unlocked state.
Figure 6:
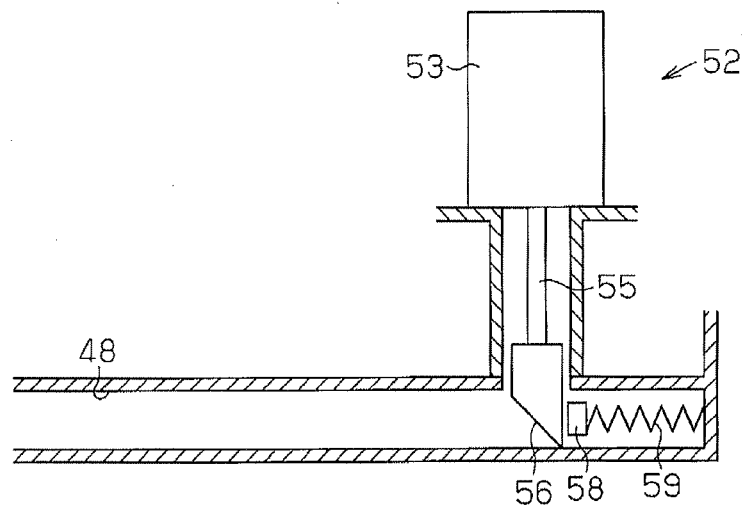
FIG. 6 is a vertical cross-sectional view illustrating the assist key lock in a key insertion wait state.

The assist key lock 52 has an invalid return prevention feature for preventing a key from being invalidly returned to the key slot 47 when the assist key 31 has been lent. For example, the assist ECU 32 functions as an invalid return monitoring unit 64 (see FIG. 4) that manages the invalid return prevention feature. For example, the CPU 33 of the assist ECU 32 executes an invalid return prevention program stored in the memory 34, thereby functionally realizing the invalid return monitoring unit 64. In FIG. 4, the invalid return monitoring unit 64 is illustrated as a block. When a key of some sort is inserted in the key slot 47, the invalid return monitoring unit 64 determines whether or not a return condition of the assist key 31 is met. If the return conditions are not met, the invalid return monitoring unit 64 does not lock the inserted key with the assist key lock 52 and does not accept the inserted key.

For example, when a key of some sort, which may be the assist key 31, is returned to the key slot 47, the verification ECU 5 performs verification of the returned key. Based on the result of the verification, the invalid return monitoring unit 64 determines that the vehicle interior verification is not established or that the assist key 31 inserted in the key slot 47 belongs to another vehicle. In this case, the invalid return monitoring unit 64 does not allow the assist key lock 52 to lock the key, thereby rejecting the return of the key. Also, the invalid return monitoring unit 64 receives detection signals from the key insertion detection switch 60 and the locked position detection switch 61. Based on the detection signals, the invalid return monitoring unit 64 determines that the assist key 31 has been left halfway inserted in the key slot 47 or that a foreign object has been inserted into the key slot 47. In this case also, the invalid return monitoring unit 64 does not allow the assist key lock 52 to lock the key, thereby rejecting the return of the key. The invalid return monitoring unit 64 corresponds to an invalid key return prevention unit.

An operation of the assist key system 30 according to the present embodiment will now be described with reference to FIGS. 8 to 19.

A case will be discussed where an authorized user of the vehicle 1 lends the vehicle 1 to a borrower with a restriction of use. First, the glove compartment 42 is in the closed state, and the assist key lock 52 of the key slot 47 in the glove compartment 42 is in the locked state. That is, the assist key 31 is inserted in the key slot 47 (the state shown in FIG. 4) and locked therein. In this state, the solenoid 53 of the assist key lock 52 has not been activated, and the movable lever 55 is at the projected position. Further, the distal end of the movable lever 55 is inserted in the engagement hole 57 of the assist key 31. Therefore, the movable lever 55 retains the assist key 31 locked in the key slot 47.

Figure 8:
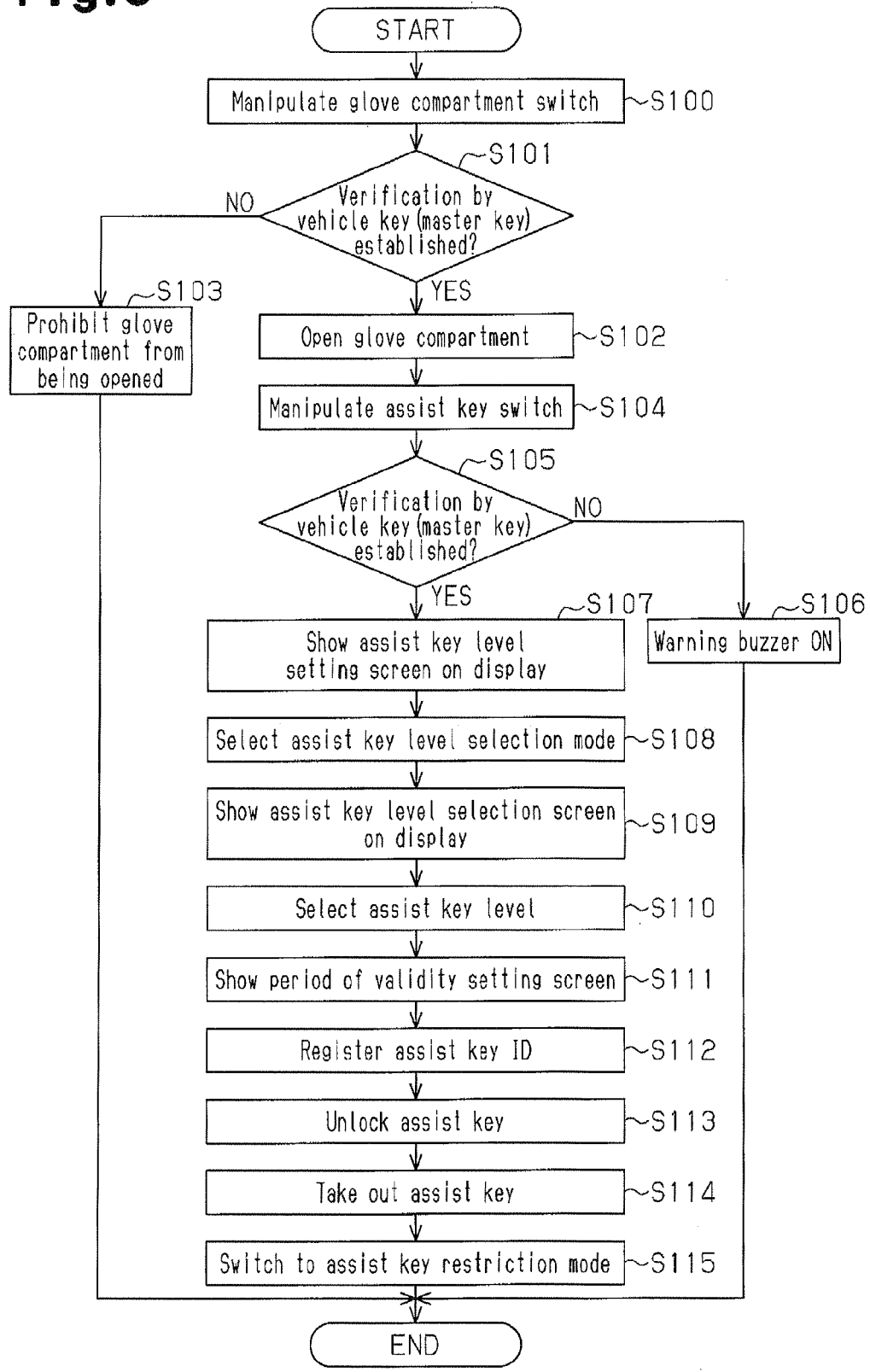
FIG. 8 is a flowchart showing an operation for lending an assist key.
Figure 14:
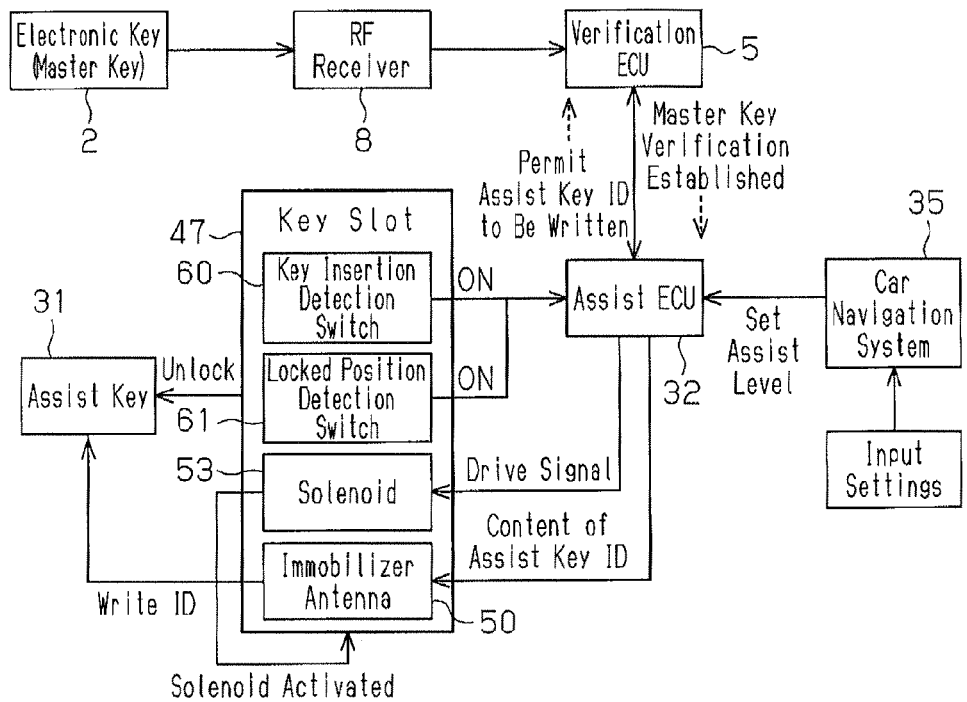
FIG. 14 is a system diagram showing a case where the assist key has been properly lent.

When lending the vehicle 1, the user gets in the vehicle 1, carrying the electronic key (master key) 2. Then, as shown in FIGS. 8 and 14, the user reaches for and presses the glove compartment switch 43 from the driver's seat in order to take out the assist key 31 in the glove compartment 42 (step 100). The pressing operation is performed to set the operation mode of the assist key system 30 to an assist key restriction mode, which is a system activated state. When the glove compartment switch 43 is pressed, the assist ECU 32 receives the result of the vehicle interior verification (which may be the immobilizer verification) from the verification ECU 5 (step 101). If the received result from the verification ECU 5 indicates that the vehicle interior verification has been established, the assist ECU 32 actuates the glove compartment lock 44, thereby opening the glove compartment 42 (step 102). If the received result from the verification ECU 5 indicates that the vehicle interior verification is not established, the assist ECU 32 does not actuate the glove compartment lock 44, thereby maintaining the glove compartment 42 in the closed state (step 103). Therefore, even if a third person who is not carrying the electronic key 2 attempts to open the glove compartment 42, the glove compartment 42 remains closed. For example, it is possible that someone may attempt to open the glove compartment 42 to simply remove an article from the glove compartment 42, without removing the assist key 31. In such a case, since the verification ECU 5 checks the result of the vehicle interior verification when the glove compartment switch 43 is pressed, the security is improved.

After the glove compartment 42 is open, the user subsequently presses the assist key switch 62 (step 104). When the assist key switch 62 is pressed, the assist ECU 32 launches the assist key level setting feature, allowing the user to set the assist key level. At this time, the assist ECU 32 receives the result of the vehicle interior verification (which may be the immobilizer verification) from the verification ECU 5 (step 105). If the received result from the verification ECU 5 indicates that the vehicle interior verification has not been established, the assist ECU 32 causes an alarm buzzer 65 to go off (see FIG. 1), warning of an unauthorized third person attempting to removing the assist key 31 (step 103). Therefore, the lending condition of the assist key 31 requires that the vehicle interior verification be established when the assist key switch 62 is pressed.

Figure 9:
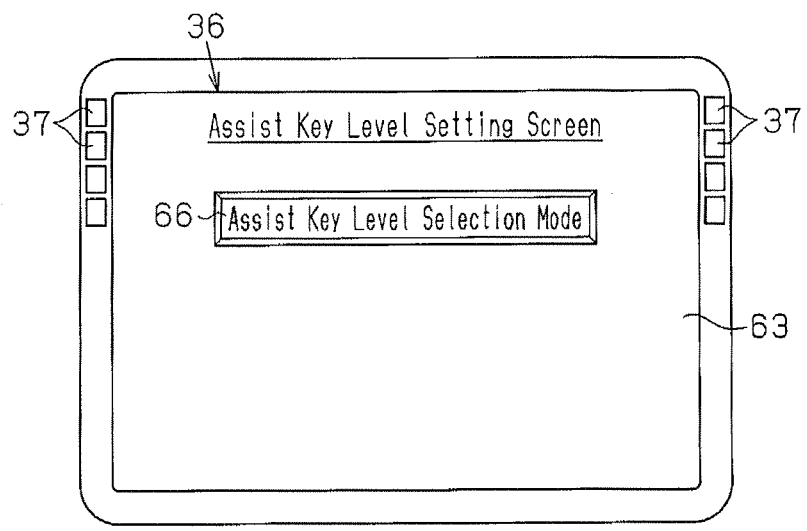
FIG. 9 is a diagram showing a screen for setting an assist key level.

When the assist key switch 62 is pressed, if the assist ECU 32 receives the result indicating that the vehicle interior verification has established, the assist ECU 32 shows the assist key level setting screen 63 shown in FIG. 9 on the display 36 of the car navigation system 35 (step 107). The assist key level setting screen 63 includes a level selection button 66. The level selection button 66 functions as a touch button that is manipulated when executing the assist key selection mode. To set the assist key level, the user touches the level selection button 66 and selects the assist key level selection mode (step 108).

Figure 10:
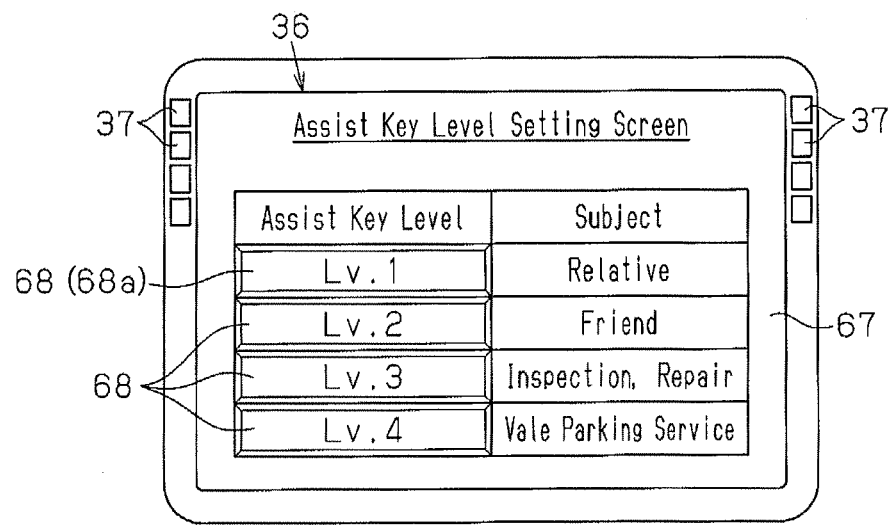
FIG. 10 is a diagram showing a screen for selecting the assist key level.

When the assist key level selection mode is selected in the assist key level setting screen 63, the assist ECU 32 shows an assist key level selection screen 67 as shown in FIG. 10 on the display 36 of the car navigation system 35 (step 109). The assist key level selection screen 67 includes a plurality of level selection buttons 68, 68, . . . , or touch buttons that are each manipulated when one of assist key levels is selected. The level selection buttons 68, 68, . . . are arranged in accordance with the screen coordinates of the display 36. In the case where the display 36 is a touch panel type, the user touches one of the level selection buttons 68, 68 . . . , thereby setting the assist key level.

As shown in FIG. 11, the greater the number of the assist key level, the higher the security level becomes. In other words, the higher the security level, the greater becomes the number of restricted vehicle functions. The assist key level 1 corresponds to a case where the vehicle borrower (subject) is a relative such as a family member, and permits the use of vehicle functions other than, for example, opening of the glove compartment 42. The assist key level 2 corresponds to a case where the vehicle borrower (subject) is a friend, and permits the use of vehicle functions other than, for example, opening of the glove compartment 42 and changing of the position memory of the driver's seat. The assist key level 3 corresponds to a case where the vehicle borrower is an employee of a repair shop that handles car inspections and repair, and permits only the functions related to the drive system and opening of the fill opening. The assist key level 4 corresponds to a case where the vehicle borrower is a hotel employee offering a valet parking service, and permits the use of the vehicle 1 with certain limit values of the travel distance and traveling speed.

When lending the vehicle 1 to a borrower, the user touches one of the level selection buttons 68, 68, ... in the assist key level selection screen 67 that corresponds to the type of the borrower, thereby selecting the assist key level of the vehicle 1 (step 110). For example, when lending the vehicle to a relative, the user touches the first level selecting button 68a on the assist key level selection screen 67 to select the assist key level 1.

When the selection of the assist key level is completed in the assist key level selection screen 67, the ECU 32 subsequently functions as a period of validity setting unit. The assist ECU 32 (period of validity setting unit) shows a period of validity setting screen 69 shown in FIG. 12 on the display 36 (step 111). The period of validity setting screen 69 has a period of validity input window 70 for inputting the values of a period of validity. For example, the user selectively touches an up button 71 and a down button 72 shown on the period of validity setting screen 69 to change the number in the period of validity input window 70, thereby setting the number of days during which the assist key restriction mode is valid. When completing the input of the period of validity, the user touches a confirm button 73 on the period of validity setting screen 69 to finish the input operation of the assist key level.

When the series of steps of the input operation of the assist key level is finished, the assist ECU 32 causes the immobilizer antenna 50 to transmit an ID registration signal Ssk including the assist key ID and drive radio waves through signals in the LF band, thereby registering the ID in the assist key 31 (step 112). The assist key ID transmitted by the immobilizer antenna 50 is preferably a rolling code, which has a different value each time the assist key system 30 enters the assist key restriction mode, that is, each time the setting operation of the assist key level is performed. The ID tag 49 of the assist key 31 is activated by the drive radio waves in the ID registration signal Ssk transmitted by the immobilizer antenna 50, and registers in its own memory 51 the assist key ID included in the ID registration signal Ssk as a unique key code. At this time, if the assist key ID of the last occasion when the vehicle 1 was lent is registered in the assist key 31, the ID tag 49 overwrites the previous ID with the new ID. When the registration of the assist key ID is normally completed, the assist key 31 transmits a registration completion notification Sok indicating the normal completion through signals in the LF band.

When the immobilizer antenna 50 receives the registration completion notification Sok transmitted by the assist key 31, the assist ECU 32 determines that the registration of the assist key ID has been completed without fail. Then, the assist ECU 32 provides the verification ECU 5 with assist key information Dkk including the assist key ID registered in the assist key 31 and the period of validity. The verification ECU 5 registers in its memory 17 the assist key ID included in the assist key information Dkk provided by the assist ECU 32, in relation to the period of validity. That is, the verification ECU 5 registers in the memory 17 the type of code string included in the assist key TD registered in the assist key 31 and the number of days of during which the code string is valid.

When the registration of the assist key ID in the assist key 31 and the verification ECU 5 is completed, the assist ECU 32 unlocks the assist key lock 52, which has been locked (step 113). Specifically, the assist ECU 32 switches the solenoid 53 from the deactivated state to the activated state, thereby retracting the movable lever 55 of the solenoid 53 (the state of FIG. 5). This disengages the movable lever 55 from the engagement hole 57 of the assist key 31, so that the assist key lock 52 is switched to the unlocked state. Accordingly, the assist key 31 becomes removable from the key slot 47. At this time, the push by the push piece 58 based on the urging force of the urging member 54 causes the assist key 31 to project from the key insertion hole 48 of the key slot 47 by a predetermined amount.

The user removes the assist key 31 from the key slot 47, which has been unlocked by the assist key lock 52, and hands the assist key 31 to a vehicle borrower to lend the vehicle (step 114). When detecting that the assist key 31 has been removed from the key slot 47 with the key insertion detection switch 60, the assist ECU 32 switches the operation mode of the assist key system 30 to the assist key restriction mode at that point in time (step 115). Accordingly, when the vehicle 1 is operated using the assist key 31, the use of the vehicle 1 is permitted under restriction of vehicle functions. When detecting the removal of the assist key 31 with the key insertion detection switch 60, the assist ECU 32 puts the solenoid 53 in the original deactivated state from the activated state. Thus, no electricity is supplied to the solenoid 53, and the movable lever 55 is moved downward by the urging member 54 in the solenoid 53 (the state shown in FIG. 6).

When the assist key 31 is permitted to be removed from the key slot 47 and the vehicle 1 is switched to the assist key restriction mode, the assist ECU 32 monitors whether the assist key 31 remains inserted in the key slot 47. For example, the assist ECU 32 measures the elapsed time from when the vehicle 1 enters the assist key restriction mode, for example, using a counter. If the assist key 31 remains inserted in the key slot 47 when the elapsed time passes a time limit, the assist ECU 32 detects neglect of removal of the assist key 31 using the key insertion detection switch 60. At this time, the assist ECU 32 indicates the neglect of removal on the display 36 of the car navigation system 35. The indication includes, for example, a notification such as "Please remove Assist Key." In this case, the assist ECU 32 forcibly terminates the setting operation of the assist key level that has been performed so far, and urges the user to start the setting operation over.

A vehicle borrower who has received the assist key 31 can lock and unlock the vehicle doors through mechanical manipulation using the key plate 31a of the assist key 31. After unlocking the vehicle door using the assist key 31 and getting in the vehicle, the vehicle borrower can start the engine by putting the assist key 31 close to the engine switch 19. That is, according to the present embodiment, the immobilizer antenna 28 of the immobilizer system 26 is incorporated in the engine switch 19. At the time when the door is opened, the immobilizer antenna 28 starts transmitting the drive radio waves Skd. Thus, when the assist key 31 is put close to the engine switch 19, the verification ECU 5 performs the immobilizer verification using the immobilizer ECU 27.

In the immobilizer verification, the verification ECU 5 performs the assist key verification by comparing the assist key ID sent from the assist key 31 with the assist key ID registered in its own memory 17. Also, the verification ECU 5 checks whether the assist key ID determined through the immobilizer verification is an ID within a period of validity. For example, the assist ECU 32 measures the elapsed time from when the vehicle 1 enters the assist key restriction mode, for example, using a counter. The verification ECU 5 compares the elapsed time with the period of validity, which has been set in the period of validity setting screen 69, thereby determining whether the assist key ID registered in the assist key 31 is still valid. If the received assist key ID has been registered in the memory 17 and the ID is within the period of validity, the verification ECU 5 determines that the ID verification with the assist key 31, that is, the assist key verification is established. At this time, the verification ECU 5 allows the vehicle 1 to be used with some restrictions on the vehicle functions. On the other hand, if the immobilizer verification is not established or if the period of validity is over even after the immobilizer verification is established, the verification ECU 5 does not allow the vehicle 1 to be operated with the lent assist key 31.

Figure 13:
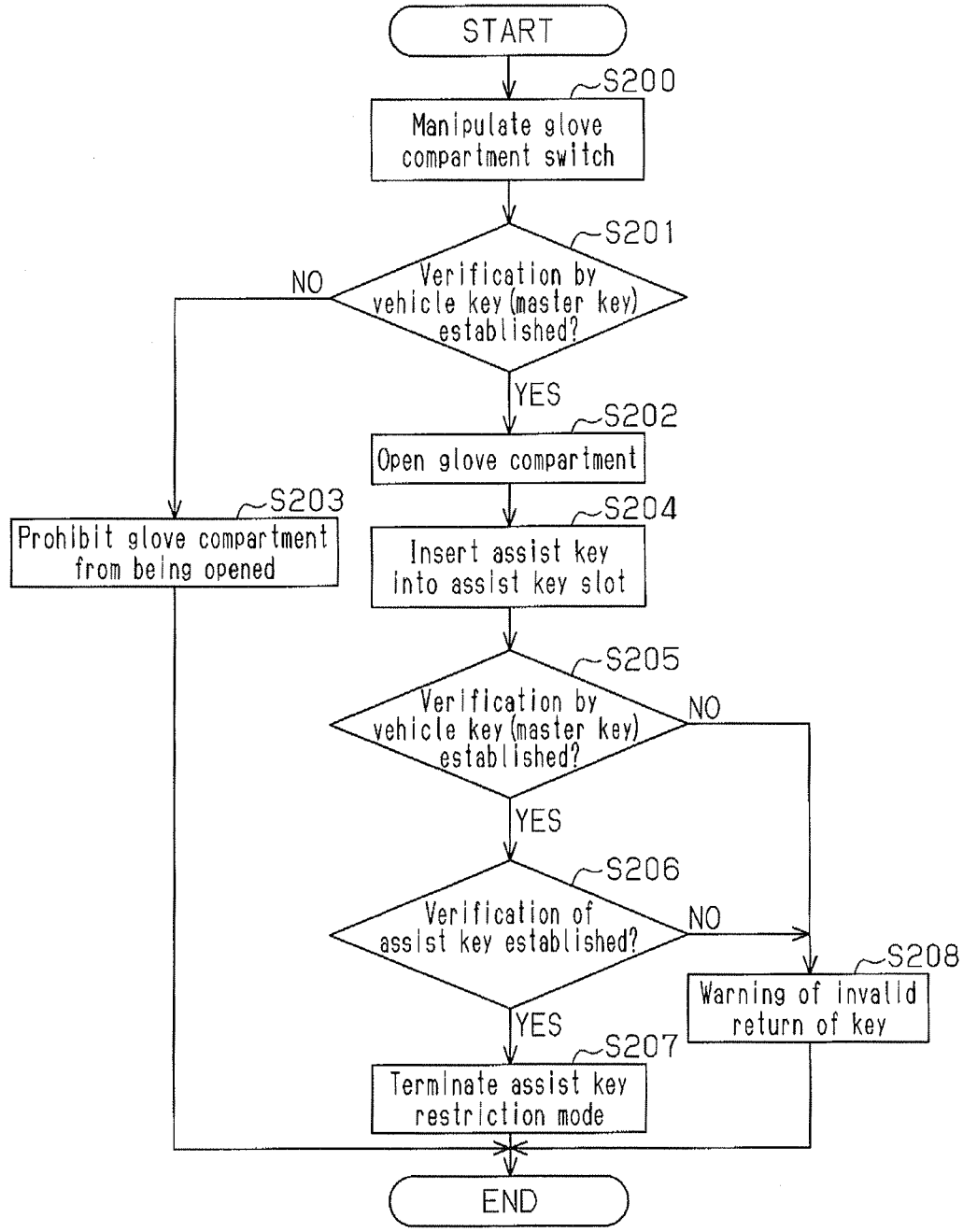
FIG. 13 is a flowchart showing an operation for returning the assist key.
Figure 15:
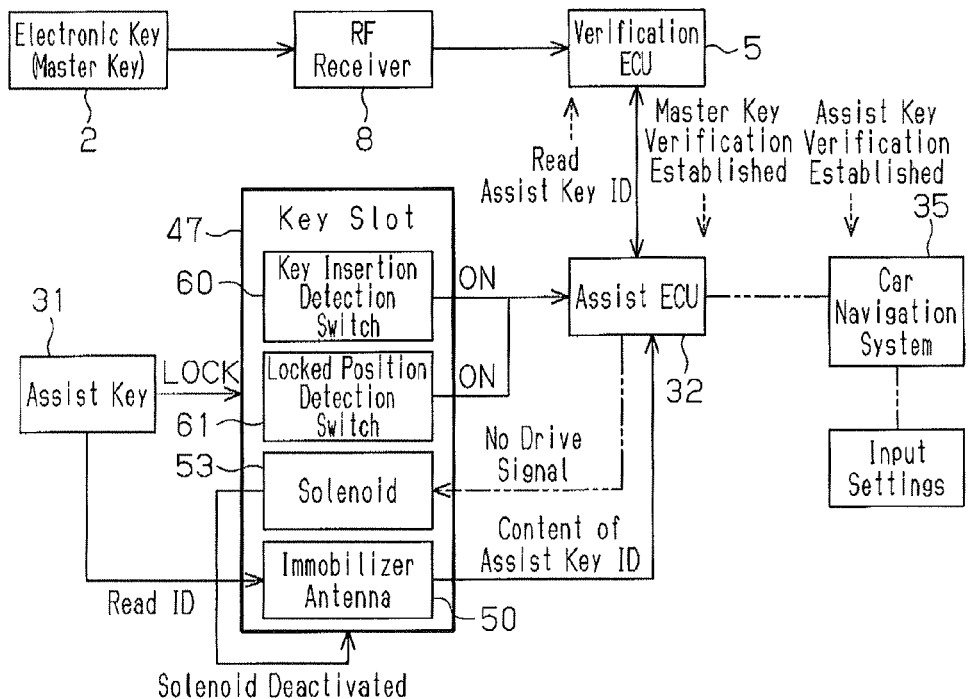
FIG. 15 is a system diagram showing a case where the assist key has been properly returned.

Next, the case will be described where the assist key 31 is returned to the key slot 47 after being lent to a vehicle borrower. In this case also, the user gets in the vehicle, carrying the electronic key (master key) 2, to establish the vehicle interior verification with the electronic key 2. Then, as shown in FIGS. 13 and 15, the user receives the assist key 31 from the vehicle borrower and presses the glove compartment switch 43 in order to open the closed glove compartment 42 (step 200).

When the glove compartment switch 43 is pressed, the assist ECU 32 receives the result of the vehicle interior verification from the verification ECU 5 (step 201). At this time, If the received result from the verification ECU 5 indicates that the vehicle interior verification has been established, the assist ECU 32 actuates the glove compartment lock 44, thereby opening the glove compartment 42 and exposing the key slot 47 in the glove compartment 42 (step 202). On the other hand, if the received result from the verification ECU 5 indicates that the vehicle interior verification is not established, the assist ECU 32 does not actuate the glove compartment lock 44, thereby maintaining the glove compartment 42 in the closed state (step 203). Therefore, a third person not carrying the electronic key 2 is not permitted to open the glove compartment 42. For example, the opening operation of the glove compartment 42 might be intended not to insert the assist key 31 in the key slot 47, but to take out an article from the glove compartment 42. Even in such a case, the result of the vehicle interior verification of the electronic key (master key) 2 is checked. This improves the security.

After the glove compartment 42 is open, the user inserts the assist key 31 in the key slot 47 (step 204). The assist ECU 32 detects that the assist key 31 has been inserted in the key slot 47 with the key insertion detection switch 60. Also, the assist ECU 32 performs the immobilizer verification with the returned assist key 31 to check whether the inserted assist key 31 is a valid key.

Specifically, the ECU 32 causes the immobilizer antenna 50 to transmit the drive radio waves Sky. The drive radio waves Sky activate the ID tag 49, which in turn transmits a key ID signal Stb including its own key code to the vehicle 1 through signals in the LF band. The assist ECU 32 receives the key ID signal Stb through the immobilizer antenna 50 and performs key verification (immobilizer verification) using the assist key ID in the key ID signal Stb. In this manner, the key verification is performed between the assist ECU 32 and the assist key 31. It is therefore possible to check whether an object such as a dummy key has been inserted in the key slot 47.

The assist ECU 32 detects, with the locked position detection switch 61, whether the assist key 31 is at the complete insertion position in the key slot 47, that is, whether the assist key 31 has been inserted to the locked position. Thereafter, the assist ECU 32 receives the result of the vehicle interior verification result of the electronic key (master key) 2 from the verification ECU 5 again.

If the received result from the verification ECU 5 indicates that the vehicle interior verification has been established, the assist ECU 32 checks the result of the key verification of the assist key 31 (step 206). If the key verification of the assist key 31 is established, the assist ECU 32 terminates the assist key restriction mode, which has been executed up to the point (step 207). At this time, the ECU 32 supplies a mode termination notification Dnd, which indicates that the assist key restriction mode is over, to the verification ECU 5. The mode termination notification Dnd is a command for deleting the assist key ID in the memory 17 when the assist key restriction mode is ended. When receiving the mode termination notification Dnd from the assist ECU 32, the verification ECU 5 deletes the assist key ID registered in the memory 17 in order to prohibit the vehicle 1 from being operated by the use of the assist key 31. The assist key ID registered in the ID tag 49 of the assist key 31 may be deleted when the assist key restriction mode is cancelled.

When the assist key 31 is inserted in the key slot 47, the assist key 31 contacts the movable lever 55. At this time, the inclined surface portion 56 at the distal end of the movable lever 55 converts the force in the direction of the insertion of the assist key 31 into a force that acts to lift the movable lever 55. The movable lever 55 is thus lifted against the urging force of the urging member 54 (the state shown in FIG. 7), which pushes the assist key 31 further inward into the key slot 47 than the movable lever 55. Then, the assist key 31 contacts the push piece 58 and pushes the push piece 58 inward against the urging force of the urging member 59. As a result, the assist key 31 is completely inserted and reaches the locked position.

When not activated, the solenoid 53 is at the projected position by the inner urging member 54. The expansion and contraction of the urging member 54 allows the movable lever 55 to reciprocate along the axial direction of the movable lever 55. When the assist key 31 is pushed to the locked position, the engagement hole 57 of the assist key 31 faces the movable lever 55. In this state, the movable lever 55, which has been lifted by the thickness of the key plate 31*a*, is moved downward by the urging force of the urging member 54 in the solenoid 53. The distal end of the movable lever 55 is therefore hooked to the engagement hole 57. Accordingly, the assist key lock 52 is switched from the unlocked state to the locked state, so that the assist key 31 is retained in the key slot 47 and locked therein.

Figure 16:
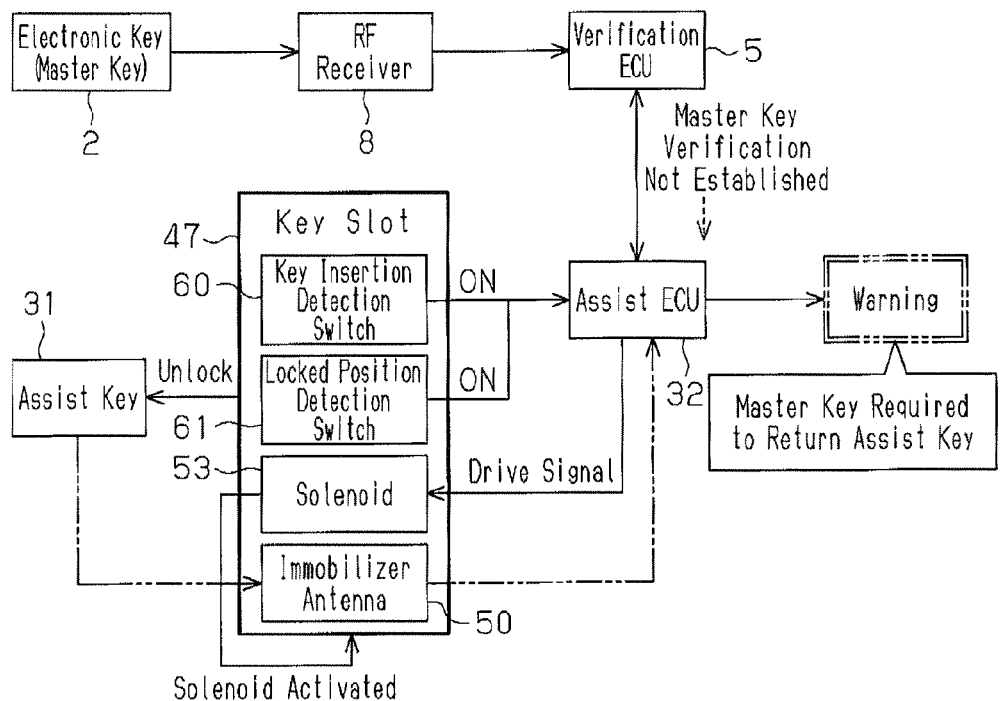
FIG. 16 is a system diagram showing a case where the verification of a master key ID is not established when the assist key is returned.

On the other hand, if the result of the vehicle interior verification sent from the verification ECU 5 indicates that the vehicle interior verification has not been established in step 206, the assist ECU 32 determines that the key return conditions are all not met and gives a warning of an invalid return of a key (step 103). At this time, the invalid return monitoring unit 64 shows on the display 36 that the vehicle interior verification is not established as shown in FIG. 16 and warns the user about an invalid return of a key. The display style of the warning includes, for example, a phrase "Master key required to return Assist key." In this manner, the invalid return monitoring unit 64 also functions as a notifying unit.

If the vehicle interior verification is not established, the invalid return monitoring unit 64 switches the solenoid 53 from the deactivated state to the activated state. Then, the movable lever 55 of the solenoid 53 is retracted upward against the urging force of the urging member 54. Therefore, even if the assist key 31 is inserted in the key slot 47, the movable lever 55 of the solenoid 53 is not engaged with the engagement hole 57 of the key plate 31*a*. The push piece 58 is thus pushed by the repelling force of the urging member 59, so that the assist key 31 in the key slot 47 is pushed in a direction out of the key insertion hole 48. In this manner, when the vehicle interior verification is not established, the key inserted in the key 47 is not held by the key slot 47. That is, when there is no valid master key (electronic key 2), the assist key 31 cannot be returned to the key slot 47 even if the assist key 31 is a valid one.

Figure 17:
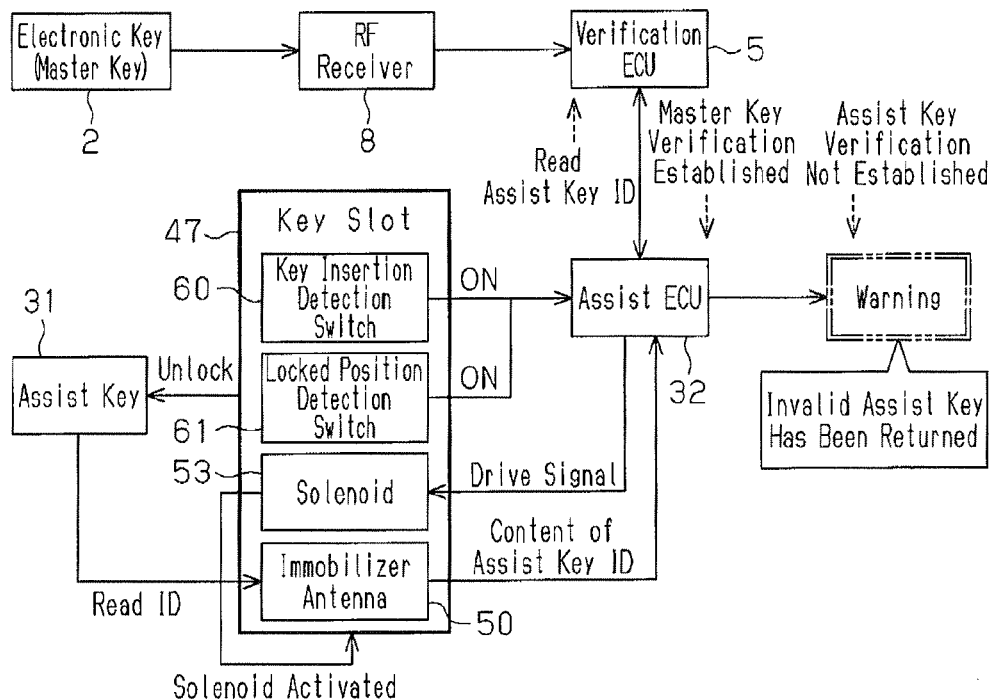
FIG. 17 is a system diagram showing a case where the verification of the assist key ID is not established when the assist key is returned.

If the result of the key verification of the assist key 31 is not established in step 206, the assist ECU 32 determines that the key return conditions are not all met and gives a warning of an invalid return of a key (step 208). At this time, the invalid return monitoring unit 64 shows on the display 36 that the key verification of the assist key 31 is not established as shown in FIG. 17 and warns the user about an invalid return of a key. The display style of the warning includes, for example, a phrase "Invalid Assist key has been returned." In this case also, the invalid return monitoring unit 64 switches the solenoid 53 to the activated state, thereby preventing an invalid key in the key slot 47 from being locked by the assist key lock 52.

Figure 18:
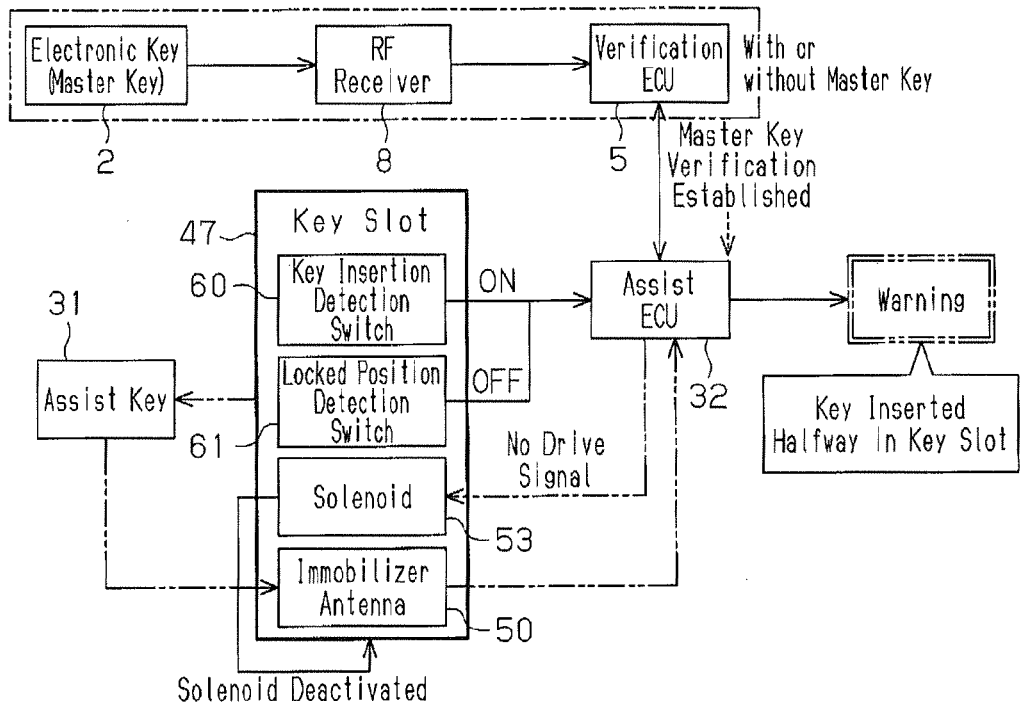
FIG. 18 is a system diagram showing a state where a key or a foreign object is inserted halfway into the key slot.

Further, as shown in FIG. 18, based on the detection signal sent from the key insertion detection switch 60 and the locked position detection switch 61, the invalid return monitoring unit 64 monitors whether the assist key 31 (including an foreign object) is inserted halfway in the key slot 47. If the assist key 31 is inserted halfway in the key slot 47, the key insertion detection switch 60 can detect a key, but the locked position detection switch 61 cannot detect a key. Thus, when detecting a key using the key insertion detection switch 60, the invalid return monitoring unit 64 cannot detect the key (key at the locked position) using the locked position detection switch 61 at the bottom of the hole within the time limit. In this case, the invalid return monitoring unit 64 recognizes that the assist key 31 is inserted halfway in the key slot 47, and displays warning, for example, on the display 36, thereby notifying the user of the halfway insertion. The display style of the warning includes, for example, a phrase "Key inserted halfway in Key Slot."

When the assist key 31 is inserted halfway in the key slot 47, the invalid return monitoring unit 64 does not activate the solenoid 53. That is, the invalid return monitoring unit 64 does not supply electricity to the solenoid 53, thereby maintaining the solenoid 53 deactivated. This is because halfway insertion of the assist key 31 in the key slot 47 indicates that the engagement hole 57 of the key plate 31a has not reached the movable lever 55 of the solenoid 53, and that the solenoid 53 does not need to be switched to the activated state.

Figure 19:
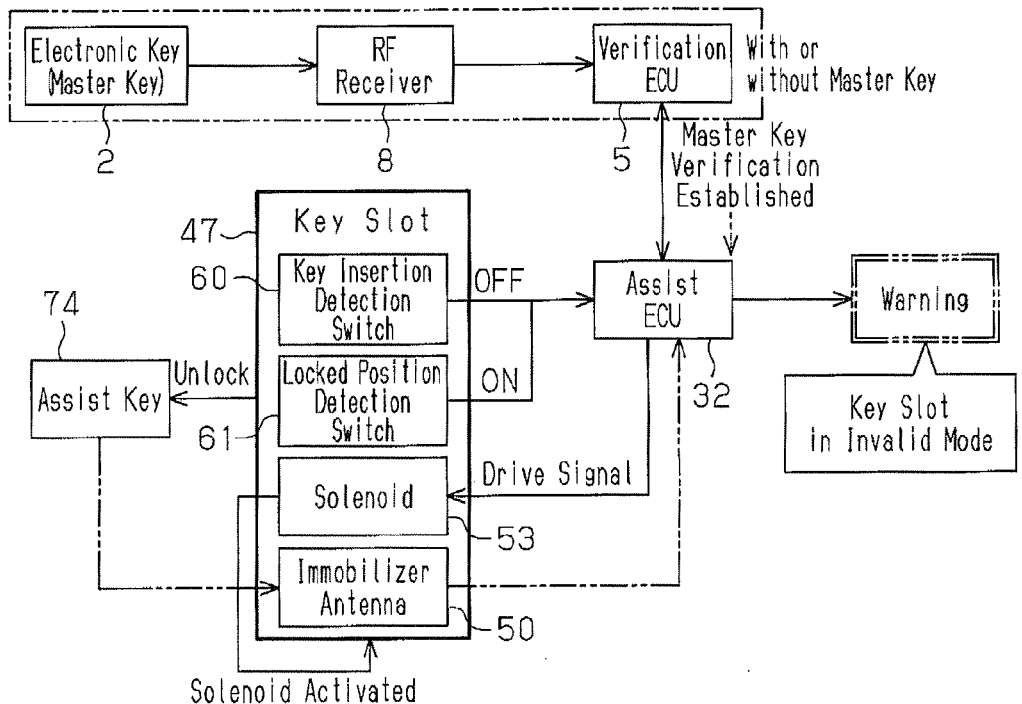
FIG. 19 is a system diagram showing a state where a key equivalent has been inserted in the key slot.

Further, as shown in FIG. 19, based on the detection signal sent from the key insertion detection switch 60 and the locked position detection switch 61, the invalid return monitoring unit 64 monitors whether a key equivalent 74 (for example, a finger or a foreign object) is inserted in the key slot 47. The key equivalent 74 refers to an object that has an elongated shape like the assist key 31 but hardly has a regular shape like a key plate. When the key equivalent 74 is inserted in the key slot 47, it can be assumed that the key insertion detection switch 60 cannot detect a key, and the locked position detection switch 61 can detect the key. Thus, when the locked position detection switch 61 detects a key even if the key insertion detection switch 60 cannot detect the key, the invalid return monitoring unit 64 recognizes that the key equivalent 74 is inserted in the key slot 47.

When the key equivalent 74 is inserted in the key slot 47, the invalid return monitoring unit 64 displays warning, for example, on the display 36, thereby notifying the user of the insertion. The display style of the warning includes, for example, a phrase "Key Slot in Invalid Mode." The invalid return monitoring unit 64 switches the solenoid 53 to the activated state so as to reject the return of a key, thereby preventing the key equivalent 74 inserted in the key slot 47 from being locked therein by the assist key lock 52.

According to the present embodiment, when the assist key 31 is returned to the key slot 47 after being lent, a key inserted in the key slot 47 is prevented from being locked by the assist key lock 52 if the vehicle interior verification by the electronic key (master key) 2 is not established, if the key verification is not established using the returned assist key 31, if the assist key 31 is inserted halfway in the key slot 47, or if a finger or a foreign object is inserted in the key slot 17. Since the assist key lock 52 is not activated when an inserted key is likely to be invalid, an invalid key return is prevented.

The key slot device of the present embodiment has the following advantages.

(1) When the assist key 31 is inserted in the key slot 47, if the key return conditions are not all met (the vehicle interior verification not established, the key verification of the assist key 31 not established, halfway insertion of a key, insertion of a finger or a foreign object), the assist key lock 52 does not lock the inserted key to the key slot 47. Therefore, when the key inserted in the key slot 47 is unlikely to be a valid key, the key is not locked by the assist key lock 52. This prevents an invalid return of a key from occurring.

(2) The conditions under which the assist key 31 is allowed to be returned to the key slot 47 include the establishment of the vehicle interior verification of the electronic key (master key) 2. Therefore, if the vehicle user, who carries the electronic key (master key) 2 is not present, the key return cannot be performed. Thus, invalid return of a key is effectively prevented.

(3) The conditions under which the assist key 31 is allowed to be returned to the key slot 47 include the establishment of the key verification of the assist key 31 inserted in the key slot 47. Therefore, when an assist key other than the valid assist key 31 is inserted in the key slot 47, the inserted key is not locked by the assist key lock 52. Thus, invalid return of a key is further effectively prevented.

(4) The conditions under which the assist key 31 is allowed to be returned to the key slot 47 include that a key in the key slot 47 is not inserted halfway. Thus, when the key is inserted halfway in the key slot 47, the key is not locked by the assist key lock 52. This prevents the assist key lock 52 from malfunctioning.

(5) The conditions under which the assist key 31 is allowed to be returned to the key slot 47 includes that an object inserted in the key slot 47 is not a key equivalent 74 (such as a finger or a foreign object). Therefore, when the key equivalent 74 is inserted in the key slot 47, it is unlikely that the assist key lock 52 locks the key equivalent 74. Thus, invalid return of a key is highly effectively prevented.

(6) When the assist key 31 is returned by being inserted in the key slot 47, warning is shown on the display 36 of the car navigation system 35 if the key return conditions are not all met. It is thus possible to notify the user that the key return conditions are not all met, the general versatility of the system is improved.

(7) The assist key system 30 of the present embodiment is capable of setting the restriction state (security level) of the vehicle 1 in accordance with each borrower of the vehicle 1 (that is, the assist key 31). In other words, when lending the vehicle 1 to a borrower, the restriction state can be set to be appropriate for the borrower. Therefore, the general versatility of the car lending system, which is capable of restricting the lending and use of the vehicle 1, is improved.

(8) Each time the assist ID is registered in the assist key 31, the key code of the assist key ID, or the code string, is changed. For example, while wireless communication is taking place between the assist key 31 and the vehicle 1, the assist key ID might be illegally intercepted. Even in this case, if the assist key 31 is lent again, the previous assist key ID cannot establish the key verification. Therefore, if the interceptor attempts to operate the vehicle 1 using the illegally intercepted assist key ID, he/she cannot move the vehicle 1. This reduces the possibility that the vehicle 1 is stolen by a person who has an illegally obtained key code.

(9) When the vehicle 1 is lent to a borrower, the key verification of the electronic key (master key) 2 needs to be established before the assist key 31 in the key slot 47 can be taken out. Thus, when switching the vehicle 1 to a restricted state, the electronic key (master key) 2 is required. Therefore, the vehicle 1 is not switched to the restricted state without the user's knowledge.

(10) A period of validity is set for the duration of use of the assist key 31, that is, for the duration of use of the vehicle 1 with restricted functions. When the period of validity is over, the vehicle 1 cannot be operated by using the assist key 31. Therefore, a vehicle borrower who carries the assist key 31 is not permanently allowed to use the vehicle 1. This reduces the possibility of theft of the vehicle 1.

(11) The assist ECU 32 mounted on the vehicle 1 registers an assist key ID in the assist key 31 and also registers the assist key ID, as the ID of the assist key 31, in the vehicle 1. This enables the assist key 31 to be used as a vehicle key under a restricted condition. That is, the vehicle 1 functions as a master that performs ID management such as registration and deletion of the assist key ID. This eliminates the necessity for providing the assist key 31 with function of ID management. In other words, the assist key 31 does not need to be equipped with a complicated function. The assist key 31 there has a simple structure.

(12) The assist key 31 is accommodated in the dashboard 41. Further, to unlock the dashboard 41, the key verification of the electronic key (master key) 2 must be established. That is, when taking out the assist key 31 accommodated in the dashboard 41, the electronic key (master key) 2 is required. Therefore, it is possible to prevent the glove compartment 42 from being illegally opened and the assist key 31 from being carried away without the user's knowledge.

(13) When returning the assist key 31 to the removed key slot 47, the immobilizer antenna 50 starts transmitting the drive radio waves Sky when the assist key 31 is inserted in the key slot 47. If whether or not the key verification of the assist key 31 is established is checked when it is returned, the drive radio waves Sky do not need to be constantly transmitted from the immobilizer antenna 50. This reduces the electricity required for transmitting radio waves, and thus improves energy conservation.

It should be apparent to those skilled in the art that the present invention may be embodied in many other specific forms without departing from the spirit or scope of the invention. Particularly, it should be understood that the invention may be embodied in the following forms.

The return conditions of the assist key 31 are not limited to those presented previously in describing the above embodiment. For example, the return conditions may include various conditions such as that the engine 10 is not running.

The lending conditions of the assist key 31 are not limited to the establishment of the vehicle interior verification of electronic key (master key) 2. For example, the lending conditions may include various conditions such as the establishment of the vehicle exterior verification of the electronic key (master key).

The solenoid 53, which functions as the actuator of the assist key lock 52, is not limited to a pull solenoid. That is, the type of solenoid is particularly limited. The actuator of the assist key lock 52 does not need to be the solenoid 53, but may be a motor. Further, the assist key lock 52 may use a structure other than a solenoid or motor to hold the assist key 31 inserted in the key slot 47 and prevent its removal.

The detection unit that detects the insertion of the assist key 31 into the key slot 47 is not limited to a microswitch, but may be other types of sensors, such as a photosensor. The insertion of the assist key 31 into the key slot 47 may be detected either at the entrance of the key hole or at the bottom.

When notifying the user that the return conditions of the assist key 31 are not all met, the method of notification is not limited to the one in which the display 36 of the car navigation system 35 is used. For example, the alarm buzzer 65 in the vehicle 1 may be used to notify the user that the return condition of the assist key 31 are not all met.

The master key verification unit is not limited to an electronic verification type (the smart verification type and the immobilizer verification type) that wirelessly transmits a key code to perform key verification, but may be a mechanical type, in which, for example, a key groove formed in the key plate is used to perform the key verification. This also applies to the auxiliary key verification unit.

The time at which the vehicle 1 enters the assist key restriction mode is not limited to the time at which the setting of the assist key level is completed and then key assist key 31 is removed from the key slot 47. For example, the vehicle 1 may enter the assist key restriction mode immediately after the assist key level is set. In this case, for example, if the user does not remove the assist key 31 from the key slot 47 within the time limit, the assist key restriction mode is forcibly terminated.

The feature of selecting the assist key level is not indispensable, and may be omitted.

The assist ECU 32 does not need to be a member separate from the verification ECU 5. That is, the functions of the ECUs 5 and 32 may be integrated into one member.

In the illustrated embodiment, when the period of validity of the assist key ID is over, the assist ECU 32 does not accept the assist key ID, so that the vehicle 1 cannot be operated by using the assist key 31. This procedure may be altered. For example, the assist key 31 may monitor the elapsed time since an assist key ID is registered in the assist key 31. When the period of validity of the assist key ID is over, the assist key 31 refrains from transmitting the assist key ID, thereby prohibiting the vehicle 1 from being operated. That is, the management of the period of validity does not necessarily need to be performed by the vehicle 1, but may be performed using the assist key 31.

The input system and the display system of the assist key system 30 do not necessarily need to be incorporated in the car navigation system, but may include dedicated input and display systems.

The input system of the assist key system 30 is not limited to a touch panel type, but may be a mechanical switch such as a push switch or a rotary switch.

The assist key 31 is not limited to one that transmits the key code through radio waves, but may be a magnetic card. A magnetic card is defined as a card that includes a magnetic recording unit in it, and is capable of recording and retrieving various types of information using external magnetism.

The assist key ID does not necessarily need to be changed each time it is registered in the assist key 31. For example, only the code string may be changed in accordance with each borrower. Also, a single code string may be used for two or more of the assist key levels. In this case, when lending the assist key 31 to a borrower, the assist ECU 32 retains at least one assist key level that corresponds to the request at the time.

The assist key ID does not need to be changed in accordance with each vehicle borrower. For example, each assist key ID may include a function code that explains the content of the key code in the assist key ID, and an appropriate assist key ID may be selected using the function code.

The RFID communication does not necessarily need to use signals in the LF band, but may use signals in, for example, the RF band.

The warning given when the key verification or the password authorization is not established is not limited to warning using the alarm buzzer 65, but may be a part that is capable of producing sound other than the sound of the alarm buzzer 65. Alternatively, warning may be given in various ways. For example, warning may be given by displaying a message on the display 36.

Time limit may be set for input operations of the assist key level selection mode and the assist key level return mode. When the input operation time passes the time limit, the input operation may be forcibly terminated.

The input buttons on the screens 63, 67, 69 are not limited to buttons that increment and decrement values, but may be a directional pad-like key.

The type of verification of the vehicle interior verification, which is a condition that needs to be met when the assist key 31 is lent or returned, is not limited to the key verification in which a code string consisting of a row of numbers and signs having a predetermined regularity is wirelessly transmitted, but may be biometric authentication that uses, for example, a finger print as a verification tool.

The vehicle 1 may have a wireless key system as a type of the electronic key system 3. In the wireless key system, when a lock button or an unlock button provided in the electronic key 2 is pressed, a wireless signal including a content in accordance with the operation of the buttons is transmitted to the vehicle 1 via signals in the low RF band from the RF transmitter 16 through short-range wireless communications, so that the door lock is unlocked.

The assist key 31 is not limited to a key that restricts the functions of use of the vehicle, but may be a key like a master key that allows the vehicle 1 to be used without restriction.

Therefore, the present examples and embodiments are to be considered as illustrative and not restrictive and the invention is not to be limited to the details given herein, but may be modified within the scope and equivalence of the appended claims.

What is claimed is:

1. A key slot device for an in-vehicle auxiliary key, the key slot device comprising:
   a key slot being capable of accommodating the auxiliary key, which is a vehicle key other than a master key;
   a key lock mechanism that locks or unlocks movement of the auxiliary key within the key slot, thereby allowing the auxiliary key to be removed from the key slot in accordance with a lending condition of the auxiliary key;
   an invalid key return prevention unit that determines whether to lock or unlock the auxiliary key within the key slot by controlling the key lock mechanism in accordance with a return condition of the auxiliary key;
   a master key verification unit performing electronic ID verification of the master key using an ID code stored in the master key;
   an auxiliary key verification unit performing electronic ID verification of the auxiliary key using an ID code stored in the auxiliary key;
   an inlet key detection unit that detects the auxiliary key in the vicinity of an inlet of a key insertion hole of the key slot; and
   an inward key detection unit that detects the auxiliary key at an inward position of the key insertion hole,
   wherein, if the return condition is met, the invalid key return prevention unit allows the auxiliary key to be returned to the key slot and causes the key lock mechanism to lock the auxiliary key within the key slot, and if the return condition is not met, the invalid key return prevention unit does not allow the auxiliary key to be returned to the key slot and causes the key lock mechanism to unlock the auxiliary key within the key slot,
   wherein the return condition of the auxiliary key comprises establishment of the electronic ID verification of the master key performed by the master key verification unit and establishment of the electronic ID verification of the auxiliary key performed by the auxiliary key verification unit, and
   wherein when the inward key detection unit does not detect the auxiliary key within a time limit after the inlet key detection unit detects the auxiliary key, the invalid key return prevention unit determines that the auxiliary key is inserted halfway in the key slot, and does not cause the key lock mechanism to lock the auxiliary key within the key slot.

2. The key slot device according to claim 1,
   wherein, if the auxiliary key is detected by the inward key detection unit despite the fact that the auxiliary key is not detected by the inlet key detection unit, the invalid key return prevention unit determines that a key equivalent different from the auxiliary key is inserted in the key slot, and the return condition of the auxiliary key includes determination that the key equivalent is not inserted in the key slot.

3. The key slot device according to claim 1, wherein the auxiliary key is a key that permits the user of the vehicle under restriction.

4. The key slot device according to claim 3, further comprising:
   a restriction setting unit restricting vehicle functions that can be used with the auxiliary key, in accordance with a person to whom the auxiliary key is lent.

5. The key slot device according to claim 4, wherein the auxiliary key is an electronic key capable of transmitting a wireless signal including a unique key code, wherein, when the key code of the auxiliary key matches a key code that has been registered in the vehicle in advance, the use of the vehicle with the auxiliary key is permitted,
   the restriction setting unit registers the key code of the auxiliary key both in the vehicle and in the auxiliary key, thereby setting a restricted state of the vehicle functions, the restriction setting unit changing the key code in accordance with a person to whom the auxiliary key is lent, thereby changing the restricted state of the vehicle functions, wherein, each time registering the key code, the restriction setting unit changes the key code.

6. The key slot device according to claim 1, further comprising:
   an auxiliary key lending permitting unit that permits the auxiliary key to be lent when verification of the master key by the master key verification unit is established.

7. The key slot device according to claim 1, further comprising:
   a period of validity setting unit that sets a period of validity for the use of the vehicle with the auxiliary key.

8. The key slot device according to claim 1, further comprising:
a notifying unit that provides notification that the auxiliary key cannot be returned to the key slot when the return condition of the auxiliary key is not met.

9. The key slot device according to claim 1, wherein said memory is writable.

10. The key slot device according to claim 1, further comprising a master key that allows the vehicle to be used without restriction.

* * * * *